United States Patent [19]

Brown et al.

[11] 4,290,887

[45] Sep. 22, 1981

[54] LIQUID SURFACE DECANTER

[76] Inventors: Arthur D. Brown; Stephen G. B. Jones, both of 65 Ocean Ave., Double Bay, New South Wales 2028, Australia

[21] Appl. No.: 81,294

[22] Filed: Oct. 2, 1979

[30] Foreign Application Priority Data

Oct. 3, 1978 [AU] Australia .............................. PD6205

[51] Int. Cl.$^3$ ............................................ E02B 15/04
[52] U.S. Cl. .................................. 210/242.1; 210/525
[58] Field of Search ....... 210/242 R, 242 S, DIG. 25, 210/525

[56] References Cited

U.S. PATENT DOCUMENTS

| | | | |
|---|---|---|---|
| 1,032,458 | 7/1912 | White | 210/242 |
| 1,203,578 | 11/1916 | Brooks | 210/242 R |
| 1,709,783 | 4/1929 | Etheredge | 210/242 |
| 2,530,594 | 11/1950 | Benedict | 210/242 R |
| 3,338,419 | 8/1967 | Smith | 210/525 |
| 3,419,153 | 12/1968 | Herny | 210/525 |
| 3,702,134 | 11/1972 | Henny, Jr. et al. | 210/DIG. 25 |
| 4,010,103 | 3/1977 | Morgan et al. | 210/242 R |
| 4,011,164 | 3/1977 | McGivem | 210/DIG. 25 |

Primary Examiner—Theodore A. Granger
Attorney, Agent, or Firm—Ladas & Parry

[57] ABSTRACT

A liquid surface decanter devised particularly for decanting clear liquid from settled effluent contained in a tank and comprising a rotatable suport pipe protruding through a side wall of a tank and a header pipe arranged parallel to the support pipe and connected thereto by a number of downcomer pipes. The header pipe is provided with longitudinal weir slots and is supported on the surface of the liquid by a buoyancy float. The level of the liquid relative to the weir slots is adjusted by the buoyancy float until liquid flows into the weir slots down the downcomer pipes and out through the support pipe at a predetermined rate causing the header pipe to fall within the tank and rotate about the axis of the support pipe.

9 Claims, 4 Drawing Figures

LIQUID SURFACE DECANTER

This invention relates to decanters and has been devised particularly, though not solely as a liquid surface decanter for decanting clear liquid from settled effluent.

In the past various methods have been provided for drawing off the clear liquid from settled effluent, such as by the use of bell-mouth weirs, but a major difficulty with decanting from the variable surface level of a liquid in a tank is to provide a system which will adjust to the surface level of liquid in the tank and yet be simple and virtually maintenance free in use. Adjustable weirs have been provided in the past but these have required complicated apparatus to follow the liquid surface levels and have incorporated sliding joints which require maintenance and may fail in use or stir the sludge on the bottom of the tank.

It is therefore an object of the present invention to provide a liquid surface decanter which will obviate or minimise the foregoing disadvantages in a simple yet effective manner or which will at least provide the public with a useful choice.

Accordingly the invention consists in a liquid surface decanter comprising a rotatable support pipe adapted to be placed below the surface of the liquid to be decanted in a substantially horizontal disposition, one or more downcomer pipes radially extending from and communicating with the interior of said support pipe, a header conduit attached to and communicating with said downcomer pipes at the opposite end thereof from said support pipe, said header conduit being orientated substantially parallel with said support pipe, a buoyancy float arranged to support said header conduit on said liquid surface, and one or more weir slots longitudinally orientated in said header conduit and laterally displaced therein so that when said header conduit is supported on the surface of said liquid by said buoyancy float said liquid flows through said slots into said header conduit and hence down said downcomer pipes to said support pipe to be discharged therefrom.

Notwithstanding any other forms which may fall within its scope, the invention will hereinafter be described in one preferred form by way of example only, with reference to the accompanying drawings in which:

FIG. 4 is an end elevation of the liquid surface decanter shown in FIG. 2.

Figure 1:
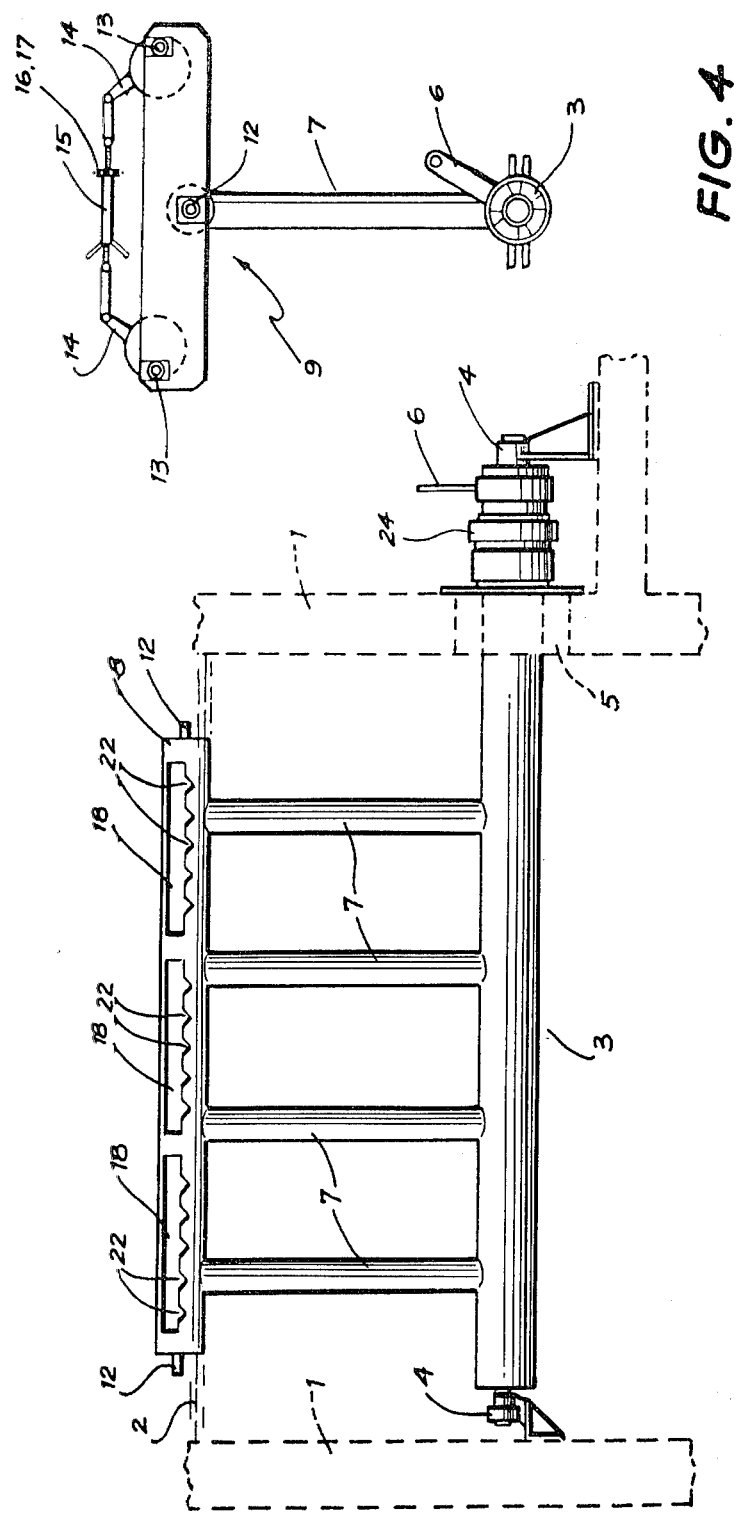
FIG. 1 is an elevation of a liquid surface decanter according to the invention, with the float thereof omitted for clarity.
Figure 2:
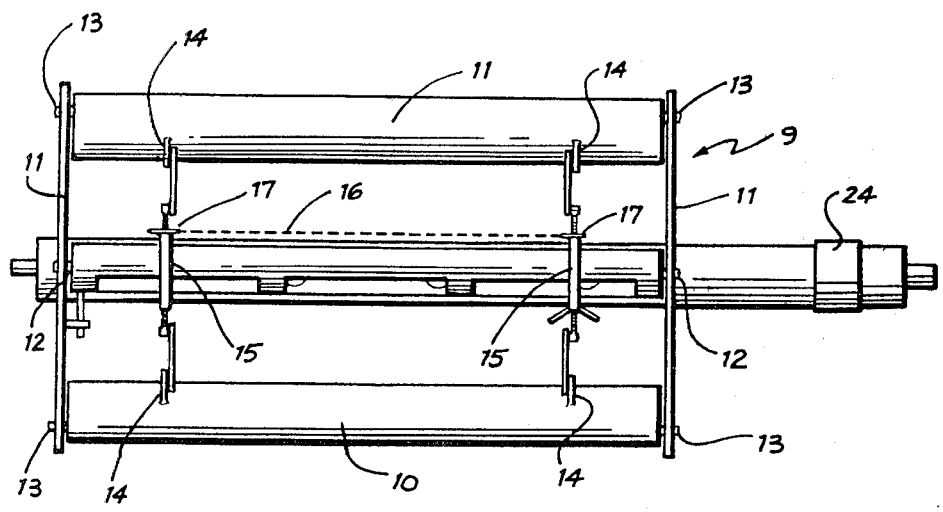
FIG. 2 is a plan view of the liquid surface decanter shown in FIG. 1.

In the preferred form of the invention a liquid surface decanter for decanting clarified liquid from the surface of settled effluent contained within a tank is constructed as follows.

The decanter is adapted to be installed in a tank having side walls 1 in which liquid is contained to a liquid surface level 2. The lower portion of the decanter comprises a rotatable support pipe 3 mounted in pin end bearings 4 at either end, one of the bearings being on one side wall of the tank and the other bearing being outside the tank. The support pipe passes through the wall of the tank, and is sealed by a gland seal 5 so as to allow rotation of the support pipe about its longitudinal axis. Control apparatus including an operating arm 6 is attached to the pipe and actuation means such as a hydraulic piston and cylinder assembly is connected to the outer end of the arm 6 to form a crank lever system so that the support pipe may be rotated through a predetermined arc by operation of the hydraulic piston and cylinder assembly.

Four downcomer pipes 7 are provided extending radially from the support pipe 3 and communicating with the interior of the support pipe. The four downcomer pipes are all parallel to one another and of the same length. A header conduit in the form of a circular pipe 8 is provided attached to and communicating with the downcomer pipes 7 at the opposite ends of the downcomer pipes from the support pipe. The header pipe is orientated so as to be substantially parallel with the support pipe 3.

A buoyancy float 9 is provided in the form of two cylindrical floats 10 arranged parallel with the header pipe 8 and supported at their outer ends by cross beams 11. The ends of the header pipe are pivotally connected to the cross-beams at the mid-point of the cross beams by pivot pins 12. The cylindrical floats 10 are also connected to the cross-beams by bearing pins 13, but unlike the header bearing pins, the pins 13 on the floats are off centre from the axis of the cylindrical floats and allow the floats to be raised or lowered relative to the beams by rotation of the floats about the pivot pins 13. To facilitate the raising or lowering of the floats, levers 14 are attached toward each end of each float connected in pairs to similar corresponding levers on the opposite float across the header pipe by means of a turn-buckle or a riggers screw 15. By adjusting the turn-buckle the floats can be made to raise or lower about their bearing pins and hence the height of the header pipe 8 relative to the liquid surface 2 may be adjusted. To facilitate adjustment of the turn-buckles they may be interconnected by way of a chain 16 engaged with sprockets 17 on each turn-buckle.

Figure 3:
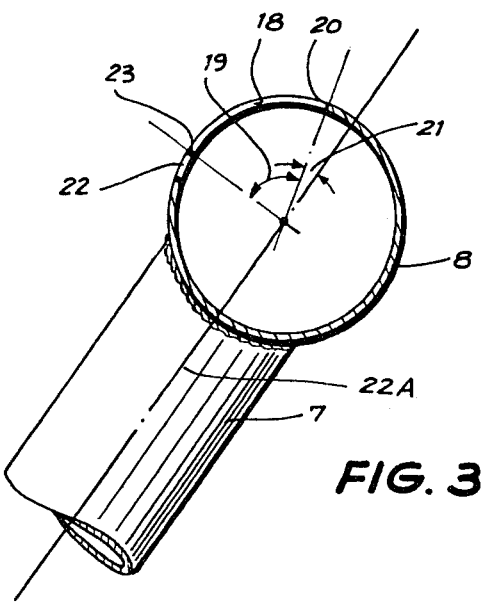
FIG. 3 is a cross-sectional elevation through the header conduit of the liquid surface decanter shown in FIGS. 1 and 2.

The header pipe is provided with three longitudinal weir slots 18 which are laterally displaced on the upper portion of the header pipe so that when the header pipe is supported on the surface of the liquid by the float 9, liquid may flow over one or both edges of the slots and into the header pipe. Referring to FIG. 3, the weir slots 18 are formed over an arc 19, subtending an angle of 80° and the leading edge 20 of the weir mouth is displaced by angle 21 of 15° from the center line 22 of the downcomer pipes 7. As the depth of liquid within the tank is lowered the attitude of the weir mouth 18 changes relative to the liquid surface and at mid travel it would be possible to reach a point where no apparent flow would take place over the wier mouth. This possible lack of flow is taken care of by having a plurality of V notches 22 cut along the trailing edge 23 of the weir mouth to allow liquid to continue to flow over the weir and into the header pipe until such time as the attitude of the leading edge 23 of the weir mouth allows liquid to flow over it directly into the header pipe. As the liquid surface is further lowered the liquid will cease to flow over the trailing edge 20.

The depth of liquid over the weir mouth and hence the intake rate of liquid from the surface into the decanter can be adjusted by raising or lowering the header pipe relative to the surface of the liquid by adjusting the turn-buckles 15.

In use, when it is designed to decant liquid from the surface thereof, the header pipe and floats are lowered onto the surface of the liquid by rotating the support pipe 3 by way of control arm 6 until the header pipe is supported on the surface of the liquid by the floats 10. Any constraint is then released from control arm 6 and the rotation of the support pipe 3 is controlled by the lowering of the floats as the liquid surface level falls within the tank. The flow rate of liquid into the header pipe and hence through the downcomer pipes 7 and the support pipe 3 is controlled by the adjustment of the weir mouth openings in the header pipe relative to the liquid surface level by way of the turn-buckles.

Once a desired amount of liquid has been decanted or once the liquid level has dropped to a desired point, the header pipe is again raised by rotation of the support pipe by way of the hydraulic piston and cylinder assembly attached to lever 6. Liquid is drained form the support pipe 3 by way of a shaft journal outlet 24.

It is a further feature of the decanter that the float and beams 10 and 11 are arranged so that they form a scum baffle around the weir mouth 18 to prevent any solids that may be floating on the surface, from entering into the weir mouth.

In this manner a liquid decanter is formed, which is particularly effective in operation and which is simple and cheap to manufacture and requires little maintenance in use. It is a feature of the decanter that there are very few moving parts to wear or cause problems with leakage. It is an advantage of the decanter, according to the invention, that the outlet pipe passes through the side wall of the tank rather than through the bottom of the tank to avoid problems with entraining or disturbing sludge.

What we claim is:

1. A liquid surface decanter comprising a rotatable support pipe adapted to be placed below the surface of the liquid to be decanted in a substantially horizontal disposition, one or more downcomer pipes rigidly attached to, radially extending from and communicating with the interior of said support pipe, a header conduit rigidly attached to and communicating with said downcomer pipes at the opposite end thereof from said support pipe, said header conduit being orientated substantially parallel with said support pipe, a buoyancy float arranged to support said header conduit on said liquid surface, and one or more weir slots longitudinally oriented in said header conduit and laterally displaced therein so that when said header conduit is supported on the surface of said liquid by said buoyancy float said liquid flows through said slots into said header conduit and hence down said downcomer pipes to said support pipe to be discharged therefrom, said weir slots incorporating opposed leading and trailing edges arranged so that liquid flows firstly over said trailing and then over said leading edge as said header conduit is lowered relative to said support pipe by rotation thereabout, and wherein said leading and trailing edges subtend a predetermined angle at the axis of said header conduit.

2. A liquid surface decanter as claimed in claim 1 wherein said header conduit comprises a cylindrical pipe having an axis substantially parallel to the axis of said support pipe.

3. A liquid surface decanter as claimed in claim 1 wherein said predetermined angle is approximately 80°.

4. A liquid surface decanter as claimed in claim 1 wherein said leading edge subtends an angle of approximately 15° at the centre of said header pipe with the longitudinal axes of said downcomer pipes.

5. A liquid surface decanter as claimed in claim 1 wherein the trailing edge of said weir slot is provided with a series of notches extending downwardly in the wall of said header pipe from said trailing edge.

6. A liquid surface decanter as claimed in claim 1 wherein the vertical disposition of said buoyancy float is adjustable relative to said header conduit so that the position of said header conduit may be adjusted relative to said liquid surface.

7. A liquid surface decanter as claimed in claim 6 wherein said buoyancy float comprises two transverse beams pivotally attached at their mid points to either end of said header conduit, and two cylindrical floats mounted parallel to said header conduit between the outer ends of said beams, said cylindrical floats being attached to said beams by pivot pins off-set from the axis of said cylindrical float and provided with adjustment means to rotate said cylindrical floats about said off-set pins so that the central axes of said cylindrical floats may be adjusted upwardly and downwardly relative to said beams.

8. A liquid surface decanter as claimed in claim 1 wherein control apparatus is provided capable of rotating said support pipe about the longitudinal axis thereof.

9. A liquid surface decanter as claimed in claim 8 wherein said support pipe is provided with a gland seal adapted to form a rotatable seal with the side wall of a tank in which said decanter is used and wherein said control apparatus is located on said support pipe on the opposite side of said gland seal from said downcomer pipes.

* * * * *